UNITED STATES PATENT OFFICE.

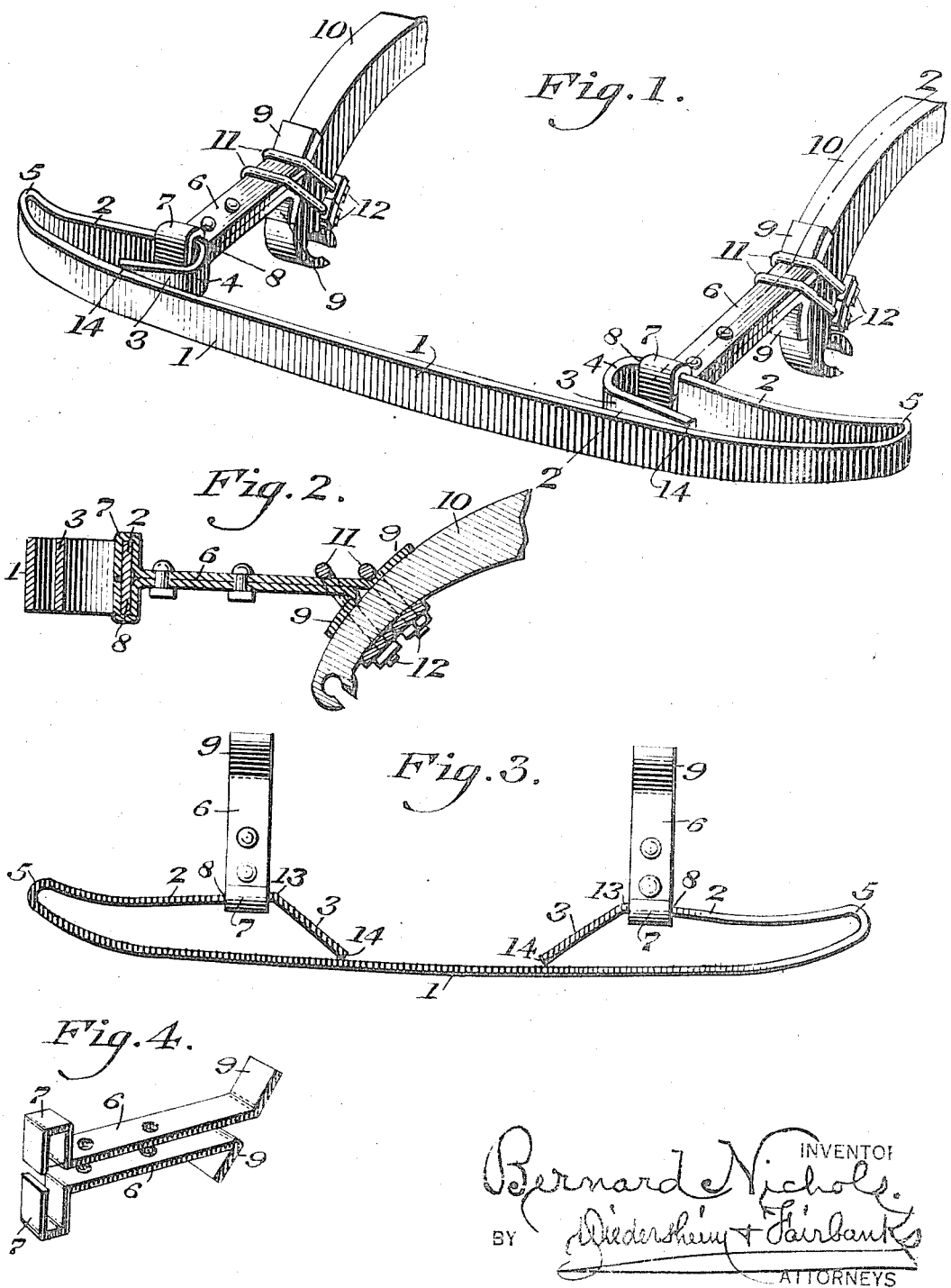

BERNARD NICHOLS, OF PHILADELPHIA, PENNSYLVANIA.

AUTO-FENDER.

1,247,442.

Specification of Letters Patent.

Patented Nov. 20, 1917.

Application filed June 9, 1917. Serial No. 173,716.

*To all whom it may concern:*

Be it known that I, BERNARD NICHOLS, a citizen of the United States, residing in the city and county of Philadelphia, State of Pennsylvania, have invented a new and useful Auto-Fender, of which the following is a specification.

My invention consists of a fender for an automobile or other motor vehicle, the same being composed of members that are highly resilient in their nature, whereby it will break the force of impact or shocks and avoid material injury to the vehicle or the object in the path of the fender, this being accomplished without the employment of separate springs, provision also being made for sustaining the body of the fender on the vehicle in a firm, steady and comparatively rigid manner.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a fender embodying my invention.

Fig. 2 represents a section thereof on the line 2—2 Fig. 1.

Fig. 3 represents a plan view of another embodiment of the invention.

Fig. 4 represents a perspective view of a detached member of the device.

Similar numerals of reference indicate corresponding parts in the figures. Referring to the drawings:—

1 designates a bar of resilient material such as steel or other suitable metal, the same comprising the front member of the fender embodying my invention.

Portions of said bar are bent back on the same forming the rear members 2 of the fender, the terminal portions of said members 2 being bent inwardly therefrom so as to form oppositely projecting salient lips 3, which as will be seen are thus interposed between the front and rear members of the device and are adapted to contact with the inner side of the front member, being presented thereto at an acute angle and adapted to slide freely thereon and said lips owing to their connection with the rear members 2 through the intervening bends 4 are rendered resilient. The front and rear members are connected on their outer ends by the bends 5, thus rendering both members resilient on each other, and producing the body of the fender of highly resilient nature, it being seen that when the front member strikes an object or is struck by the same, it yields rearwardly and impinges on the lips 3, the latter also yielding rearwardly, and as additional resiliency is afforded by the rear members 2, the fender will be highly effective in receiving the shock imparted to it without severely jarring the chassis or body of the vehicle or injuring the same.

In order to connect the fender with the body of the chassis, I employ brackets which are composed of the arms 6 which are formed of a plurality of metallic bars, each having at its front end portion loop-shaped members or clamps 7, the pairs of such clamps being adapted to embrace the rear members 2 of the body of the fender as at 8, said arms being riveted together, whereby they are virtually connected as one, and said members are clamped firmly and so sustained on said arms. Referring to Fig. 1 it will be noticed that the lips 3 being interposed between the front member and said clamps 7 extend in front of the latter and form resilient guards which serve to break the force of blows on the front member and prevent the clamps 7 from being struck and injured by said front member.

The rear end portions of said arms are deflected forming oppositely flaring tongues 9 which are fitted on the bucklers or arms 10, the latter projecting forwardly from the chassis or body of the vehicle, said tongues being connected with said bucklers by the clevises or staple like members 11 which embrace said bucklers and tongues and are clamped thereto by the nuts 12 on the legs of the clevis.

In Fig. 3 I show another embodiment of the invention in that the lips 3 extend from the bends 13 on the rear members and incline saliently toward each other so that the terminals 14 of said lips contact at an acute angle with the front member of the fender where said lips receive resiliently the impact of said member, when the latter is subjected to concussion or shock, the same as at the terminals 14 in Fig. 1. It will be noted that the rear members 2 are clamped by the brackets 6, adjacent to the bends 4 of the lips 3. This leaves said members 2 great freedom to move resiliently by reason of the bends 5 on the resilient front member 1, and allows also the greatest freedom of resilient motions of said lips 3 to and from the front and rear members, presenting triple resilient actions when the front member is subjected to the shock as has been stated. It will be noticed that the arms 6 clamp the rear members 2 on the inner portions thereof adjacent to the bends 4 or 13 intermediate of said members and the lips 3, and thus said rear members while firmly clamped at said portions are in the main resilient throughout their lengths, while said lips and the front member 1 preserve their resiliencies through their entire lengths, and so a highly resilient device is produced.

Having thus described my invention what I claim as new and desire to secure by Letters Patent, is:—

1. A fender consisting of a front resilient member, rear resilient members extending inwardly from the terminals of said front member, and resilient lips on the inner terminals of said rear members, said lips having their end portions extending at an acute angle to said front member and adapted to contact freely therewith, said members and lips being of integral construction.

2. A fender consisting of a front resilient member, rear resilient members extending inwardly from the terminals of said front member, and resilient lips on the inner terminals of said rear members extending at an acute angle to said front member and adapted to contact freely therewith, and supports for the fender provided with means which are adapted to clamp said rear members, said lips being interposed between the front and rear members and forming guards in front of said means.

BERNARD NICHOLS.

Witnesses:
WALTER J. WEISS,
DAVID H. COHEN.